US012603230B2

(12) United States Patent
Suzuki et al.

(10) Patent No.: US 12,603,230 B2
(45) Date of Patent: Apr. 14, 2026

(54) MULTILAYER ELECTRONIC COMPONENT

(71) Applicant: KYOCERA Corporation, Kyoto (JP)

(72) Inventors: Tatsuya Suzuki, Kirishima (JP); Hirotoshi Kii, Kirishima (JP); Atsushi Miyabayashi, Aira (JP); Kenta Nakashima, Kirishima (JP); Satoru Naokawa, Yasu (JP); Daisuke Fukuda, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 19/223,152

(22) Filed: May 30, 2025

(65) Prior Publication Data

US 2025/0292969 A1 Sep. 18, 2025

Related U.S. Application Data

(63) Continuation of application No. PCT/JP2024/039196, filed on Nov. 5, 2024.

(30) Foreign Application Priority Data

Dec. 1, 2023 (JP) ................................. 2023-203881

(51) Int. Cl.
| | |
|---|---|
| *H01G 4/30* | (2006.01) |
| *H01G 4/008* | (2006.01) |
| *H01G 4/232* | (2006.01) |

(52) U.S. Cl.
CPC ............. *H01G 4/30* (2013.01); *H01G 4/2325* (2013.01); *H01G 4/0085* (2013.01)

(58) Field of Classification Search
CPC ........ H01G 4/232; H01G 4/0085; H01G 4/30; H10G 4/2325; H10G 4/248; H10G 4/008
USPC ............. 361/301.4, 321.1, 321.3, 306.3, 303
See application file for complete search history.

(56) References Cited

U.S. PATENT DOCUMENTS

| | | | |
|---|---|---|---|
| 2008/0210564 A1 | 9/2008 | Motoki et al. | |
| 2010/0302704 A1* | 12/2010 | Ogawa ................. | H01G 4/2325 |
| | | | 361/306.3 |
| 2011/0149471 A1* | 6/2011 | Hur ........................ | H01G 4/008 |
| | | | 361/321.2 |
| 2011/0290542 A1 | 12/2011 | Nishisaka et al. | |
| 2014/0293503 A1 | 10/2014 | Sasabayashi et al. | |
| 2017/0018359 A1 | 1/2017 | Kimura et al. | |
| 2017/0018361 A1 | 1/2017 | Nishisaka | |

(Continued)

FOREIGN PATENT DOCUMENTS

| | | |
|---|---|---|
| CN | 101356602 A | 1/2009 |
| JP | 2012-009813 A | 1/2012 |

(Continued)

*Primary Examiner* — Arun Ramaswamy
(74) *Attorney, Agent, or Firm* — Volpe Koenig

(57) ABSTRACT

In a multilayer electronic component, an effective portion includes dielectric layers and internal electrodes alternately laminated in a laminating direction. A cover is superposed on the effective portion from a first side in the laminating direction. An underlying electrode is superposed on the cover from the first side. An external electrode is superposed on the underlying electrode from the first side. The underlying electrode and the external electrode are secured by sharing a diffusion layer in which a material of the underlying electrode and a material of the external electrode coexist with each other.

14 Claims, 6 Drawing Sheets

(56)     References Cited

U.S. PATENT DOCUMENTS

| | | | |
|---|---|---|---|
| 2020/0312565 A1 | 10/2020 | Kanzaki et al. | |
| 2022/0319774 A1 | 10/2022 | Kato | |
| 2023/0154678 A1 | 5/2023 | Lee et al. | |
| 2023/0298818 A1 | 9/2023 | Kishi et al. | |
| 2023/0368976 A1* | 11/2023 | Fukuda | H01G 4/2325 |
| 2024/0258037 A1 | 8/2024 | Zenzai | |

FOREIGN PATENT DOCUMENTS

| | | | |
|---|---|---|---|
| JP | 2014-212298 A | 11/2014 | |
| JP | 2017-022365 A | 1/2017 | |
| JP | 2017-027987 A | 2/2017 | |
| JP | 2020-167231 A | 10/2020 | |
| JP | 2023-073974 A | 5/2023 | |
| JP | 2023-135456 A | 9/2023 | |
| TW | 202305845 A | 2/2023 | |
| WO | 2023/085264 A1 | 5/2023 | |

* cited by examiner

| No. | t1 ($\mu$m) | t2 ($\mu$m) | Qual. |
|-----|-----|-----|-------|
| E1 | 1.0 | 1.0 | 0/100 |
| E2 | 1.0 | 1.5 | 0/100 |
| E3 | 1.5 | 1.0 | 0/100 |
| E4 | 3.0 | 3.5 | 0/100 |
| E5 | 3.5 | 3.0 | 0/100 |
| E6 | 3.5 | 3.5 | 0/100 |
| E7 | 0.9 | 0.9 | 2/100 |

MULTILAYER ELECTRONIC COMPONENT

CROSS REFERENCE TO RELATED APPLICATIONS

This application claims priority based on International Application No. PCT/JP2024/039196, filed May 11, 2024, which claims benefit of priority from Japanese Patent Application No. 2023-203881 filed on Dec. 1, 2023, and the entire contents of the Japanese patent application are incorporated herein by reference.

BACKGROUND OF THE INVENTION

1. Field of the Invention

The present disclosure relates to multilayer electronic components such as a multilayer ceramic capacitor.

2. Description of the Related Art

As multilayer electronic components, for example, multilayer ceramic capacitors are known (for example, Japanese Unexamined Patent Application Publication Nos. 2014-212298 and 2023-135456). The multilayer ceramic capacitors include, for example, a main body portion configured to directly perform the function of the capacitor and an external electrode for mounting the capacitor on a circuit board or the like. The main body portion includes dielectric layers and internal electrodes having a flat-plate shape. The dielectric layers and the internal electrodes are alternately laminated. According to Japanese Unexamined Patent Application Publication Nos. 2014-212298 and 2023-135456, an underlying electrode included in a surface of the main body portion is provided, and a metal layer is deposited on the underlying electrode by plating. Thus, the external electrode is formed.

SUMMARY OF THE INVENTION

According to an aspect of the present disclosure, a multilayer electronic component includes an effective portion, a cover, an underlying electrode, and an external electrode. The effective portion includes dielectric layers and internal electrodes alternately laminated in a laminating direction. The cover is superposed on the effective portion from a first side out of the first side and a second side in the laminating direction. The underlying electrode is superposed on the cover from the first side. The external electrode is superposed on the underlying electrode from the first side. The underlying electrode and the external electrode are secured by sharing a diffusion layer in which a material of the underlying electrode and a material of the external electrode coexist with each other.

BRIEF DESCRIPTION OF THE DRAWINGS

FIG. 5 is a table listing evaluation results of capacitors according of the examples.

DESCRIPTION OF THE PREFERRED EMBODIMENTS

Figure 1:
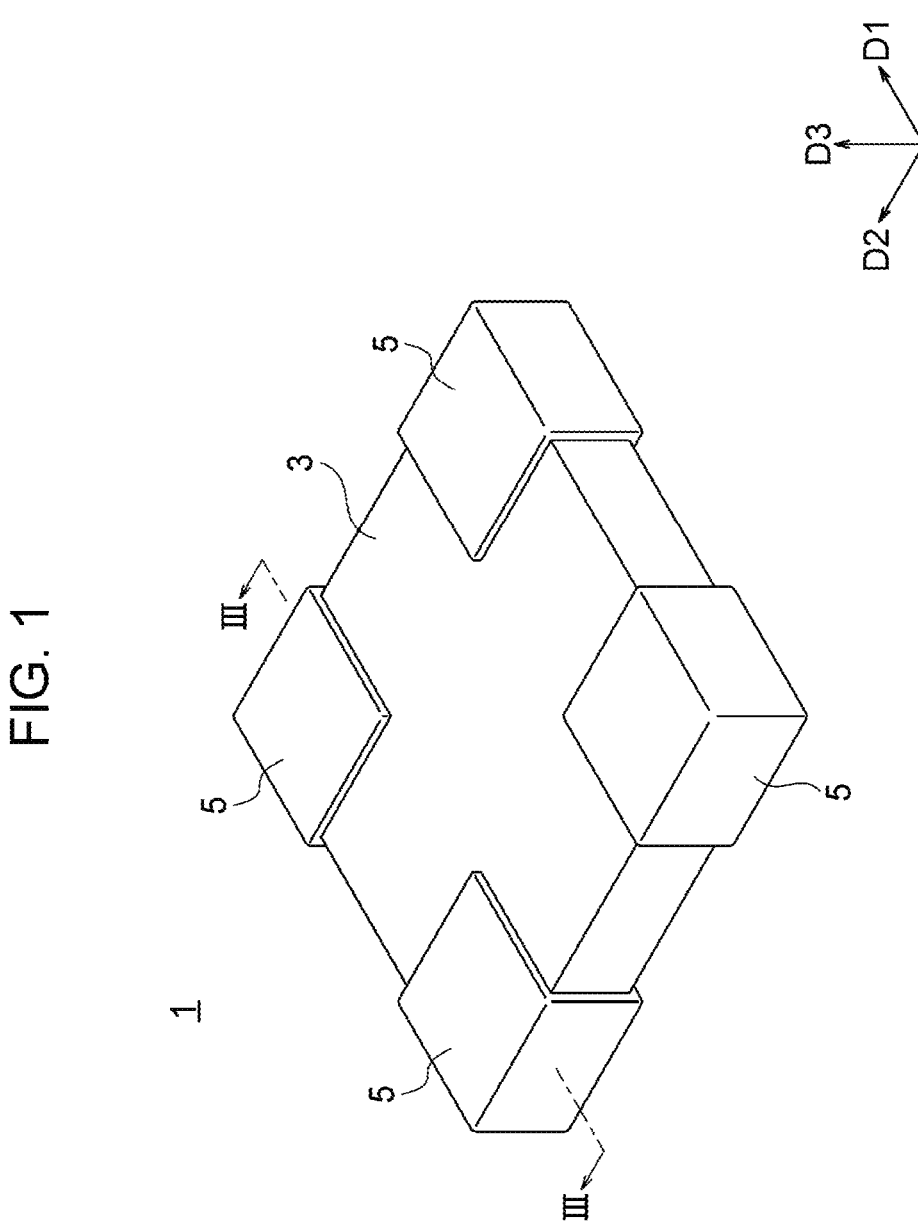
FIG. 1 is a perspective view illustrating a capacitor according to a first embodiment.

Hereinafter, embodiments according to the present disclosure will be described with reference to the drawings. The drawings to be used for the following description are schematic. Thus, for example, ratios between the dimensions in the drawings are not necessarily coincident with actual ratios. Furthermore, the ratios between the dimensions or the like are not necessarily coincident between the drawings. Specific shapes, dimensions, and/or the like may be exaggerated, or the details may be omitted. However, the above description does not deny the approval of reflection of the shapes and/or dimensions of the drawings in the actual shapes and/or dimensions or extraction of the features of the shapes and/or dimensions from the drawings.

For modes to be described relatively later, basically, only the differences from modes described relatively earlier are described. Items not particularly described may be regarded as the same as or similar to the items of earlier described modes or presumed from the items of the earlier described modes. For convenience, elements of different modes which are elements corresponding to each other may be denoted by the same reference numerals even when there is a difference between those elements.

In the following description, corner portions of a "rectangle" (or a rectangular shape) and a "square" (or a square shape) may be chamfered by, for example, being rounded as long as the concepts of the above-described shapes hold. For example, a corner portion formed by two sides may be chamfered in a length smaller than or equal to $\frac{1}{5}$, $\frac{1}{10}$, or $\frac{1}{20}$ of a length of a shorter side of the two sides. It is needless to say that, in microscopic view, corner portions may be rounded with respect to accuracy (errors) in the manufacturing. This is also applicable to other polygons and the like similarly or in the same manner.

Outline of Embodiments

FIG. 1 is a perspective view illustrating a capacitor 1 (an example of a multilayer electronic component) according to a first embodiment. For convenience, a rectangular coordinate system D1D2D3 are defined in FIG. 1 and other drawings to be referred to later. In the capacitor 1, any side may be defined as an upper side or a lower side. However, in the description of the embodiments, for convenience, a +D3 side may be defined as the upper side, and based on this, the terms such as an upper surface and a lower surface may be used.

The capacitor 1 is, for example, a multilayer ceramic capacitor. The capacitor 1 includes a main body portion 3 having a substantially rectangular parallelepiped shape and four external electrodes 5 positioned at four corners of the main body portion 3 in plan view (when seen in the D3 direction). The external electrodes 5 contribute to electrical connection between the capacitor 1 and another electronic component (for example, a circuit board (not illustrated)).

Figure 3:
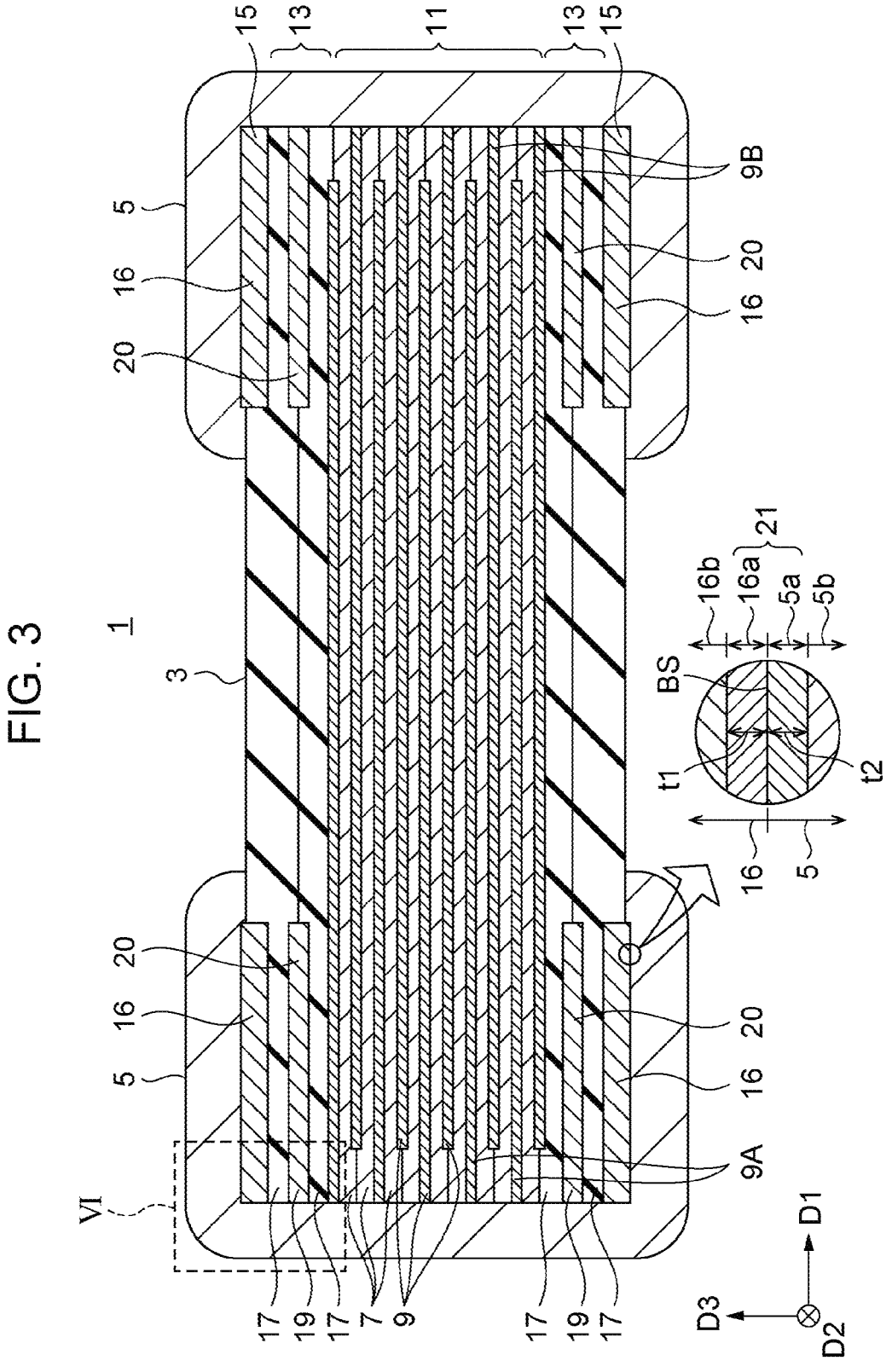
FIG. 3 is a sectional view taken along line III-III illustrated in FIG. 1.

FIG. 3 is a sectional view taken along line III-III illustrated in FIG. 1. FIG. 3 illustrates a D1D3 section cutting the external electrodes 5 on a +D2 side. However, a D1D3 section cutting the external electrodes 5 on a −D2 side, a D2D3 section cutting the external electrodes 5 on a −D1 side, and a D2D3 section cutting the external electrodes 5 on a +D1 side are basically the same as or similar to the above-described section taken along line III-III. In the description of the embodiments, for convenience, the positional relationships or the like between the elements may be described with the terms D1, D2, and D3 based on the section illustrated in FIG. 3 without particular specification.

The main body portion 3 includes, for example, an effective portion 11, two covers 13 are respectively superposed on an upper and lower surfaces of the effective portion 11, and underlying layers 15 are respectively superposed on surfaces of the covers 13 opposite from the effective portion 11. The effective portion 11 includes a plurality of dielectric layers 7 and a plurality of internal electrodes 9 which are alternately laminated. The plurality of internal electrodes 9 include a plurality of first internal electrodes 9A and a plurality of second internal electrodes 9B. The underlying layers 15 include, for example, four underlying electrodes 16 at positions corresponding to the positions of four external electrodes 5. The external electrodes 5 are superposed on the underlying electrodes 16.

The effective portion 11 is configured to directly perform the function of a capacitor. The covers 13 contribute to, for example, protection and improvement of the strength of the main body portion 3. The underlying electrodes 16 contribute to, for example, deposition of metal which is to becomes the external electrodes 5 by plating and/or improvement of a securing force of the external electrodes 5 to the main body portion 3.

An enlarged view of a boundary portion between one of the underlying electrodes 16 and a corresponding external electrode 5 is illustrated at a lower part of FIG. 3. An external diffusion layer 5a is formed by diffusion of the material of an underlying electrode 16 (for example, metal) in the external electrode 5. An underlying diffusion layer 16a is formed by diffusion of the material of the external electrode 5 (for example, metal) in the underlying electrode 16. A diffusion layer 21 is formed by the external diffusion layer 5a and the underlying diffusion layer 16a. That is, the underlying electrode 16 and the external electrode 5 are secured to each other by sharing the diffusion layer 21 in which the material of the underlying electrode 16 and the material of the external electrode 5 coexist with each other.

When the diffusion layer 21 is formed, a securing force of the external electrode 5 to the underlying electrode 16 increases. This reduces a probability of peeling off of the external electrode 5 from the main body portion 3. Formation of the diffusion layer 21 requires heating at temperatures higher than or equal to an appropriate temperature. The diffusion layer 21 is not formed only by forming a film of a metal material on the underlying electrode 16.

The above-described effect is not necessarily produced. A technical thought from a viewpoint different from the above-described viewpoint may be extracted from the present disclosure. For example, a technical thought about the relative relationship between lengths Li and Ld, which will be described later, may be extracted. In this case, for example, the diffusion between the underlying electrode 16 and the external electrode 5 is not necessarily produced.

An outline of the embodiments has been described. Specifically, the embodiments will be generally described in the following order.

1. Structure of capacitor according to first embodiment (FIGS. 1 to 3)
  1.1. Overall structure
  1.2. Effective portion
  1.3. Cover
  1.4. Underlying electrode
  1.5. External electrode
2. Diffusion layer
  2.1. Material of diffusion layer
  2.2. Thickness of diffusion layer
3. Method for manufacturing capacitor
4. Structures of capacitor according to other embodiments
  4.1. Second embodiment (FIG. 4) and the like
  4.2. Third embodiment (FIG. 6)
5. Examples
6. Summarization of embodiments

1. Structure of Capacitor According to First Embodiment

1.1. Overall Structure

Referring to FIG. 1, the capacitor 1 is configured as, for example, a chip component for surface mounting. Specifically, for example, the capacitor 1 is disposed so as to cause a surface of the capacitor 1 on the −D3 side or the +D3 side to face a circuit board (not illustrated). When four pads of the circuit board and four external electrodes 5 are respectively bonded to each other with a conductive bonding material (not illustrated, for example, solder), the capacitor 1 is mounted on the circuit board.

The structure (an internal structure and an external shape) of the capacitor 1 is, for example, generally plane symmetric about a symmetric plane (not illustrated) that is parallel to a D1D2 plane and passes through the center in a thickness direction (D3 direction) of the capacitor 1. Furthermore, the structure of the capacitor 1 is, for example, 180-degree rotational symmetric when seen in the D3 direction. Of course, the capacitor 1 does not necessarily have such symmetric properties.

The shape of the main body portion 3 is, for example, generally a thin rectangular parallelepiped shape having a small thickness. This rectangular parallelepiped may be a square (the illustrated example) or a rectangle (other than a square. This is also applicable in the following description similarly or in the same manner) in plan view. In the description of the embodiments, for convenience, the description may be made assuming that the main body portion 3 has a square shape without particular specification.

The specific dimensions of the main body portion 3 (or the capacitor 1) are arbitrary. In an example of the dimensions of the capacitor 1 having a comparatively small size, the length in each of the D1 direction and the D2 direction may be greater than or equal to 0.030 mm and smaller than or equal to 0.200 mm in the main body portion 3 (or the capacitor 1). When the length in the D1 direction is L and the length in the D2 direction is W, L/W may be greater than or equal to 0.5 and smaller than or equal to 2.0. The thickness in the D3 direction may be greater than or equal to 0.030 mm and smaller than or equal to 0.200 mm. When a surface of the main body portion 3 is not flat, for example, the maximum value may satisfy the above-described range for the various dimensions (this is also applicable to various dimensions of other elements similarly or in the same manner unless contradiction or the like arises).

Examples of the dimensions of the elements which will be described later are for the capacitor 1 having a comparatively small size even when it is not particularly specified. Accordingly, the dimensions greater (or smaller) than the dimensions represented as the examples may be used.

For example, unless otherwise specified or unless contradiction or the like arises, basically (for example, except for relatively small differences. This is also applicable to the following description similarly or in the same manner), a plurality of elements of the same type (for example, 5, 7, 9, 13, 15, 16, 17, 19, 20, or the like) may have the same (or corresponding) shape and size, may be formed of the same (or corresponding) material, and may be provided at the same (or corresponding) positions. Accordingly, unless otherwise specified or unless contradiction or the like arises, description of one element may be regarded as description common to the plurality of elements of the same type.

The entirety of a single layer-shaped (film-shaped) element (for example, 5, 7, 9, 15, 17, 19, or the like) may be formed of a single-type material. Alternatively, such an element may be formed by laminating layers of different materials.

1.2. Effective Portion

The shape of the effective portion 11 illustrated in FIG. 3 is, for example, generally a thin rectangular parallelepiped shape. In plan view, the shape of the effective portion 11 is basically the same as the shape of the main body portion 3. A specific thickness of the effective portion 11 is arbitrary. For example, the thickness of the effective portion 11 may be greater than or equal to 30%, 40%, or 50% of the thickness of the main body portion 3 and smaller than or equal to 90%, 80%, or 70% of the thickness of the main body portion 3. Any one of the above-described lower limits and any one of the above-described upper limits may be combined with each other. The thickness of the main body portion 3 is, for example, a thickness from an upper surface of the underlying electrode 16 on the upper surface side to a lower surface of the underlying electrode 16 on the lower surface side. The thickness of the effective portion 11 is, for example, a thickness from an upper surface of the uppermost internal electrode 9 to a lower surface of the lower most internal electrode 9.

The dielectric layers 7 basically (at at least between internal electrodes 9) have a layer shape having a fixed thickness. The thickness of the dielectric layers 7 may be appropriately set in accordance with the characteristics and the like required for the capacitor 1. As examples of a comparatively small thickness, the thickness between the internal electrodes 9 adjacent to each other (between the first internal electrode 9A and the second internal electrode 9B) may be greater than or equal to 0.1 μm or 0.5 μm and smaller than or equal to 3.0 μm, 2.0 μm, or 1.0 μm. Any one of the above-described lower limits and any one of the above-described upper limits may be combined with each other. In plan view, the shape and the dimensions of the dielectric layers 7 are basically the same as the shape and the dimensions of the effective portion 11. The material of the dielectric layers is, for example, ceramic. The specific type of the ceramic is arbitrary. The number of the laminated dielectric layers 7 (internal electrodes 9) is arbitrary. For example, the number of laminated dielectric layers 7 is greater than or equal to 10 and smaller than or equal to 30.

The internal electrodes 9 have a layer shape having a fixed thickness. The thickness of the internal electrodes 9 is arbitrary. For example, the thickness of the internal electrodes 9 may be smaller than, greater than, or the same as or similar to the thickness of a region of the dielectric layer 7 between the internal electrodes 9. As examples of a comparatively small thickness, the thickness of the internal electrodes 9 may be greater than or equal to 0.3 μm or 0.5 μm and smaller than or equal to 3.0 μm, 2.0 μm, or 1.0 μm. Any one of the above-described lower limits and any one of the above-described upper limits may be combined with each other.

The material of the internal electrodes 9 is, for example, metal. The specific type of the metal is arbitrary. For example, the entirety or the main ingredient of the metal of the internal electrodes 9 (or the material of the internal electrodes 9) is a base metal (for example, Ni and/or Cu). The main ingredient refers to an ingredient of, for example, greater than or equal to 60 mass %. Hereinafter, this is also applicable to other materials similarly or in the same manner. In addition to the metal, the internal electrodes 9 may include ceramic. This ceramic may be a common material for the case where the internal electrodes 9 are formed by a conductive paste that is simultaneously fired with ceramic green sheets which is to become the dielectric layers 7 (hereinafter, for convenience, ceramic in the electrodes is referred to as the common material). The common material may be the same as, for example, an ingredient (for example, the main ingredient) included in the dielectric layers 7. For example, the common material may be barium titanate. The content of the common material in the internal electrodes 9 (after fired) is arbitrary and may be, for example, greater than or equal to 1 mass % and smaller than or equal to 30 mass %.

Figure 2:
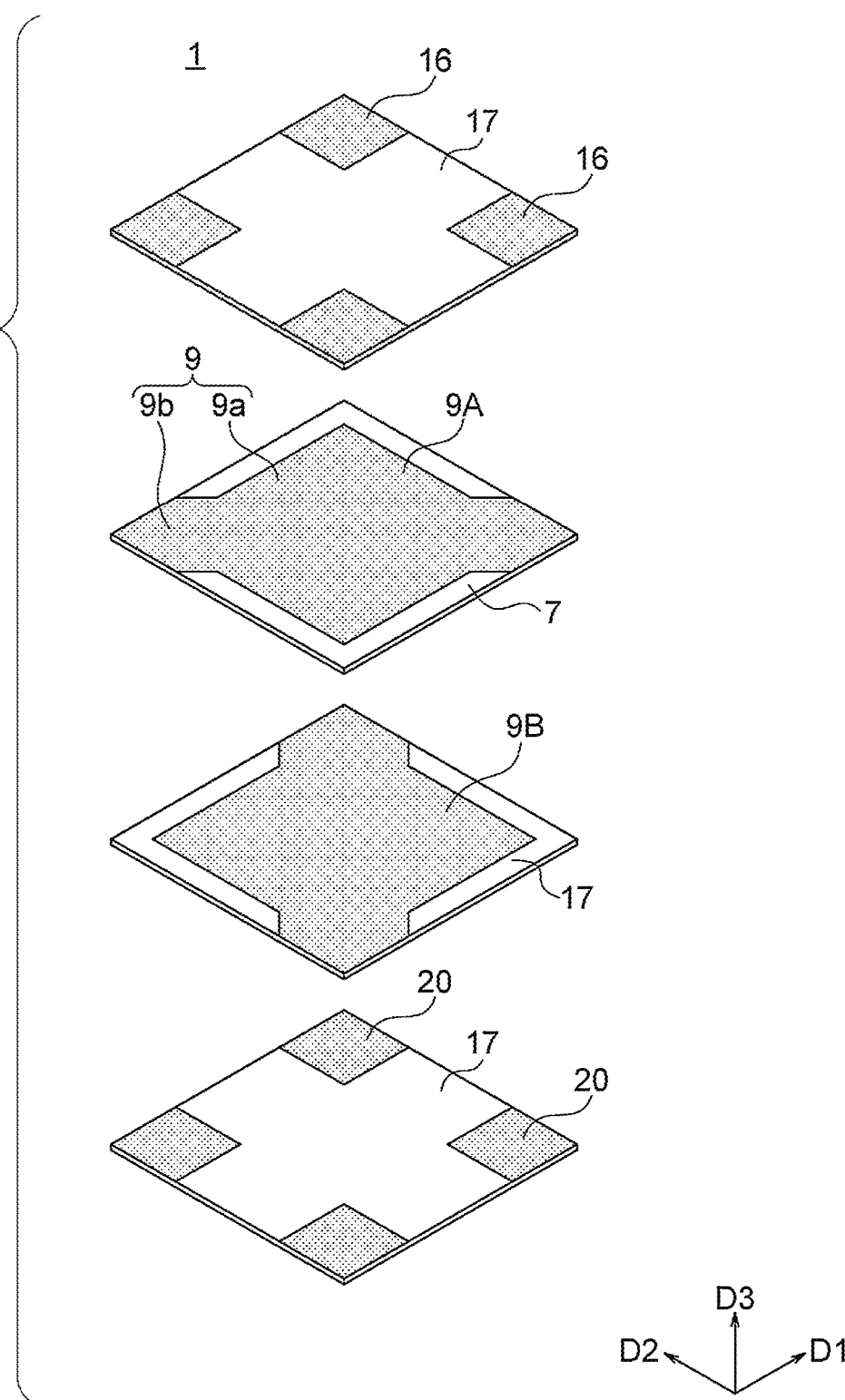
FIG. 2 is a schematic exploded perspective view of the capacitor illustrated in FIG. 1.

FIG. 2 is an exploded perspective view of the capacitor 1. FIG. 2 is schematic for grasping the shapes and the relative positions of the internal electrodes 9 and the like. Thus, the numbers of the illustrated various layers are smaller in FIG. 3 than in FIG. 2.

The internal electrodes 9 each include, for example, an electrode main body 9a having a rectangular shape (square shape in the illustrated example) in plan view and a pair of drawn electrodes 9b extending from a pair of corner portions of the electrode main body 9a facing each other. The internal electrode 9 is positioned inside external edges of the dielectric layers 7 without being exposed at side surfaces of the effective portion 11. The pair of drawn electrodes 9b reach the external edges of the dielectric layers 7 and are respectively connected to a pair of the external electrodes 5 positioned at a pair of corner portions of the main body portion 3 facing each other.

The first internal electrode 9A and the second internal electrode 9B face each other with the dielectric layer 7 interposed therebetween. The pair of drawn electrodes 9b of the first internal electrode 9A and the pair of drawn electrodes 9b of the second internal electrode 9B are positioned on different diagonal lines in transparent plan view. The pair of drawn electrodes 9b of the first internal electrode 9A and the pair of drawn electrodes 9b of the second internal electrode 9B are connected to different pairs of external electrodes 5.

The various dimensions of the electrode main body 9a and the drawn electrodes 9b are arbitrary. For example, a length of the drawn electrode 9b on one side of the dielectric layer 7 (the length of a one side at an edge portion) is substantially the same as a length of the external electrode 5 along the above-described one side.

1.3. Cover

Referring to FIG. 3, the covers 13 generally have, for example, a layer shape having a shape and dimensions that allow proper superposition of the covers 13 on the effective portion 11. A thickness of the covers 13 is substantially fixed in a region where the underlying electrode 16 is disposed and a region where the underlying electrode 16 is not disposed. The ratio of the thickness of the covers 13 to the thickness of the main body portion 3 may be generally reverse of the ratio of the thickness of the effective portion

11 to the thickness of the main body portion 3. For example, in a mode in which the covers 13 are provided on the both sides in the D3 direction, the thickness of a single cover 13 may be, for example, greater than or equal to 5%, 10%, or 15% of the thickness of the main body portion 3, and smaller than or equal to 35%, 30%, or 25% of the thickness of the main body portion 3. Any one of the above-described lower limits and any one of the above-described upper limits may be combined with each other. The thickness of the covers 13 is, for example, a thickness of a region that is superposed on the internal electrodes 9 and is not superposed on the underlying electrodes 16 (not crushed by the underlying electrodes 16).

Each cover 13 includes, for example, a plurality of (two in the example illustrated in FIG. 3) insulating layers 17 and at least one (one in the example illustrated in FIG. 3) dummy layer 19 positioned between the plurality of insulating layers 17. Each dummy layer 19 includes, for example, four dummy electrodes 20 at positions corresponding to the positions of four external electrodes 5. The dummy electrodes 20 contribute to, for example, reinforcement of the cover 13 and/or improvement of connection strength between the main body portion 3 and the external electrodes 5. Furthermore, in a mode in which the external electrodes 5 are formed by plating, the dummy electrodes 20 function as primary layer for the plating. Unlike the illustrated example, the cover 13 may only include one or more insulating layers 17 (the cover 13 does not necessarily include the dummy layer 19).

The insulating layers 17 and the dummy layers 19 are alternately laminated one layer after another. In other words, the dummy layers 19 are provided at all the boundaries between the insulating layers 17. Unlike the illustrated example, the dummy layers 19 may be provided only a subset of the plurality of boundaries. For example, the dummy layers 19 may be provided only at one or more boundaries relatively far from the effective portion 11 while no dummy layers 19 are provided at one or more boundaries relatively close to the effective portion 11. In such a case, when two or more insulating layers 17 are in close contact with each other without the dummy layer 19 interposed therebetween, these insulating layers 17 may be regarded as a single insulating layer 17.

The insulating layers 17 generally have a layer shape having a fixed thickness except for variations in thickness caused by the difference between the presence and absence of superposition on the conductor layers (9, 15, and 19). In plan view, the shape of the insulating layers 17 is, for example, basically the same as the shape of the dielectric layers 7. The material of the insulating layers 17 is arbitrary. For example, the material of the insulating layers 17 may be the same as or different from the material of the dielectric layers 7. Furthermore, the material of the insulating layers 17 may be, for example, ceramic or a material other than ceramic.

The thickness of the insulating layers 17 is arbitrary. For example, the thickness of the insulating layers 17 may be greater than (illustrated example), equal to, or smaller than the thickness of the dielectric layers 7. Each of the thickness of the insulating layers 17 and the thickness of the dielectric layers 7 is a thickness between the conductor layers or a thickness of a region not superposed on the conductor layers. This is also applicable to the entirety of this paragraph similarly or in the same manner. For example, the thickness of the insulating layers 17 may be greater than or equal to 2 times, 3 times, or 5 times the thickness of the dielectric layers 7 and smaller than or equal to 20 times, 10 times, or 5 times the thickness of the dielectric layers 7. Any one of the above-described lower limits and any one of the above-described upper limits may be combined with each other. For example, the thickness of the insulating layers 17 may be greater than or equal to 1.0 μm or 2.0 μm and smaller than or equal to 10.0 μm, or 5.0 μm. Any one of the above-described lower limits and any one of the above-described upper limits may be combined with each other. An insulating layer superposed on the uppermost internal electrode 9 may be regarded not as the dielectric layer 7 but as the insulating layer 17 regardless of the material and the thickness of the superposed insulating layer. This is also applicable to an insulating layer superposed on the lowermost internal electrode 9 similarly or in the same manner.

The dummy electrodes 20 basically have a layer shape having a fixed thickness. The material of the dummy electrodes 20 is, for example, metal. The specific type of the metal is arbitrary. For example, the entirety or the main ingredient of the metal of the dummy electrodes 20 (or the material of the dummy electrodes 20) is a base metal (for example, Ni and/or Cu). As is the case with the internal electrodes 9, the dummy electrodes 20 may include ceramic. The description of the ceramic in the internal electrodes 9 may be incorporated in description of the ceramic in the dummy electrodes 20 by replacing the terms of the internal electrodes 9 and the terms of the dielectric layers 7 with the terms of the dummy electrodes 20 and the terms of the insulating layers 17, respectively. The material of the dummy electrodes 20 may be the same as or different from the material of the internal electrodes 9.

In plan view, the positions, the shape, and the dimensions of the dummy electrodes 20 are arbitrary. In the example illustrated in FIGS. 2 and 3, the positions, the shape, and the dimensions of the dummy electrodes 20 are set to be positions, a shape, and dimensions which are generally properly superposed on the external electrodes 5 in transparent plan view (however, the external electrodes 5 are slightly larger). The dummy electrodes 20 are exposed at, for example, the side surfaces of the main body portion 3. These exposed portions firmly secured to the external electrodes 5.

The thickness of the dummy electrodes 20 is arbitrary. For example, the thickness of the dummy electrodes 20 may be greater than (illustrated example), the same as or similar to, or smaller than the thickness of the internal electrodes 9. For example, the thickness of the dummy electrodes 20 may be greater than or equal to 1 time, 1.5 times, or 2 times the thickness of the internal electrodes 9 and smaller than or equal to 10 times, 5 times, or 2 times the thickness of the internal electrodes 9. Any one of the above-described lower limits and any one of the above-described upper limits may be combined with each other. For example, the thickness of the dummy electrodes 20 may be greater than or equal to 0.3 μm, 0.5 μm, 1.0 μm, or 2.0 μm and smaller than or equal to 10.0 μm, 5.0 μm, 3.0 μm, or 2.0 μm. Any one of the above-described lower limits and any one of the above-described upper limits may be combined with each other. Furthermore, the thickness of the dummy electrodes 20 may be smaller than (illustrated example), the same as or similar to, or greater than the thickness of the insulating layers 17.

1.4. Underlying Electrode

The underlying electrodes 16 basically have, for example, a layer shape having a fixed thickness. The material of the underlying electrodes 16 is, for example, metal. The specific type of the metal is arbitrary. For example, the entirety or the main ingredient of the metal of the underlying electrodes 16

(or the material of the underlying electrodes 16) is a base metal (for example, Ni and/or Cu). As is the case with the internal electrodes 9 and the dummy electrodes 20, the underlying electrodes 16 may include ceramic. The description of the ceramic in the internal electrodes 9 may be incorporated in description of the ceramic of the underlying electrodes 16 by replacing the terms of the internal electrodes 9 and the terms of the dielectric layers 7 with the terms of the underlying electrodes 16 and the terms of the insulating layers 17, respectively. The material of the underlying electrodes 16 may be the same as or different from the material of the internal electrodes 9 and/or the material of the dummy electrodes 20.

In plan view, the positions, the shape, and the dimensions of the underlying electrodes 16 are arbitrary. In the example illustrated in FIGS. 2 and 3, the positions, the shape, and the dimensions of the underlying electrodes 16 are set to be positions, a shape, and dimensions which are generally properly superposed on the external electrodes 5 in transparent plan view (however, the external electrodes 5 are slightly larger).

The thickness of the underlying electrodes 16 is arbitrary. For example, the thickness of the underlying electrodes 16 may be greater than (illustrated example), the same as or similar to, or smaller than the thickness of the internal electrodes 9 and/or the thickness of the dummy electrodes 20. For example, the thickness of the underlying electrodes 16 may be greater than or equal to 2 times, 3 times, or 5 times the thickness of the internal electrodes 9 and/or the thickness of the dummy electrodes 20 and smaller than or equal to 20 times, 10 times, or 5 times the thickness of the internal electrodes 9 and/or the thickness of the dummy electrodes 20. Any one of the above-described lower limits and any one of the above-described upper limits may be combined with each other. For example, the thickness of the underlying electrodes 16 may be greater than or equal to 2.0 μm, 3.0 μm, or 5.0 μm and smaller than or equal to 20.0 μm, 10.0 μm, or 5.0 μm. Any one of the above-described lower limits and any one of the above-described upper limits may be combined with each other. Furthermore, the thickness of the underlying electrodes 16 may be smaller than, the same as or similar to, or greater than (illustrated example) the thickness of the insulating layers 17.

1.5. External Electrode

The external electrodes 5 basically have, for example, a layer shape having a fixed thickness. The material of the external electrodes 5 is, for example, metal. The specific type of the metal is arbitrary. For example, the entirety or the main ingredient of the metal of the external electrodes 5 (or the material of the external electrodes 5) is a base metal (for example, Ni and/or Cu). The external electrodes 5 may include or do not necessarily include nonmetal (for example, ceramic). In the embodiments, basically, the latter is described as the example. According to need, the external electrodes 5 may be formed by laminating materials different from each other. For example, the external electrodes 5 may be formed by laminating Cu, Ni, and Sn from the underlying electrodes 16 side. The material of the external electrodes 5 may be the same as or different from the material of the internal electrodes 9, the material of the dummy electrodes 20, and/or the material of the underlying electrodes 16. However, before diffusion bonding, at least the material of a layer of the external electrodes 5 in contact with the underlying electrodes 16 is different from the material of a layer of the underlying electrodes 16 in contact with the external electrodes 5.

As illustrated in FIG. 1, in plan view, for example, each of the external electrodes 5 generally covers four surfaces (the upper surface, the lower surface, and two side surfaces) of the main body portion 3 at a corresponding one of the corner portions of the main body portion 3. Thus, one of the external electrodes 5 and one of the drawn electrodes 9b are connected to each other at two side surfaces of the main body portion 3, and the capacitor 1 can be surface mounted by using the upper surface or lower surface. The shapes and the dimensions of parts of the external electrode 5 in the surfaces are arbitrary. The planar shape of the parts of the external electrode 5 positioned on the upper surface or the lower surface of the main body portion 3 is, for example, a rectangular shape (square shape in the illustrated example). Regarding the planar shape and the dimensions of the parts of the external electrode 5 positioned on the side surfaces of the main body portion 3, for example, the planar shape is a rectangular shape and the lateral length of the planar shape is the same as the lateral length of the parts positioned on the upper surface or the lower surface.

The thickness of the external electrodes 5 is arbitrary. For example, the thickness of the external electrodes 5 may be greater than the thickness of the internal electrodes 9, the dummy electrodes 20, and the underlying electrodes 16. For example, the thickness of the external electrodes 5 may be greater than or equal to 1.2 times, 2 times, or 3 times the thickness of the underlying electrodes 16 and smaller than or equal to 10 times, 5 times, or 3 times the thickness of the underlying electrodes 16. Any one of the above-described lower limits and any one of the above-described upper limits may be combined with each other. For example, the thickness of the external electrodes 5 may be greater than or equal to 3 μm, 5 μm, or 10 μm and smaller than or equal to 30 μm, 20 μm, or 10 μm. Any one of the above-described lower limits and any one of the above-described upper limits may be combined with each other.

2. Diffusion Layer

2.1. Material of Diffusion Layer

The main ingredient of the underlying electrodes 16 (or the metal of the underlying electrodes 16. This is also applicable to the following description similarly or in the same manner) is referred to as a first metal. The main ingredient of the external electrodes 5 is referred to as a second metal. The first metal and the second metal are different from each other. Hereinafter, for convenience, without particular specification, the material of the underlying electrodes 16 diffused in the external electrodes 5 is exemplified by the first metal, and the material of the external electrodes 5 diffused in the underlying electrodes 16 is exemplified by the second metal. In the following description, unless contradiction or the like arises, the terms of the first metal and the terms of the material of the underlying electrodes 16 may be replaced with each other, and the terms of the second metal and the terms of the material of the external electrodes 5 may be replace with each other.

In the following description, for convenience, the description of diffusion may focus only on metal without particular specification. For example, unless contradiction or the like arises, mass % described below may be understood as a value without consideration of the common material (metal and nonmetal included in the common material) included in the underlying electrodes 16. However, unless contradiction or the like arises, mass % may be understood as a value with consideration of the common material (from a different viewpoint, all the ingredients of the underlying electrodes 16). Exceptionally, atom % described below is targeted for all the atoms included in the underlying electrodes 16 or the external electrodes 5. For example, a denominator (or a numerator) of atom % in the underlying electrodes 16 includes the quantity of the elements included in the common material.

A portion of the underlying electrode 16 other than the underlying diffusion layer 16a is referred to as an underlying non-diffusion layer 16b. A portion of the external electrode 5 other than the external diffusion layer 5a is referred to as an external non-diffusion layer 5b. A boundary between the underlying electrode 16 and the external electrode 5 is referred to as an interface BS.

The underlying non-diffusion layer 16b does not necessarily exist. That is, the second metal of the external electrode 5 may be diffused throughout the thickness of the underlying electrode 16 so that the entirety of the underlying electrode 16 becomes the underlying diffusion layer 16a. This description of the underlying non-diffusion layer 16b is also applicable to the external non-diffusion layer 5b similarly or in the same manner.

Before the first metal of the underlying electrode 16 is diffused in the external electrode 5, the external diffusion layer 5a and the external non-diffusion layer 5b are included in a single metal layer including the same material. Before the above-described diffusion, the external electrode 5 may be formed by laminating a plurality of metal layers. However, in the description below, for convenience, the above-described single metal layer may be understood as the external electrode 5 and expressed as such without particular specification. This description of the external electrode 5 is also applicable to the underlying electrode 16 similarly or in the same manner.

When another metal layer exists on a side of the external non-diffusion layer 5b opposite from the underlying electrode 16, the material of the other metal layer may be diffused in the external non-diffusion layer 5b. In the following description, for convenience, description of such diffusion is omitted. Unless otherwise specified or unless contradiction or the like arises, description relating to the ingredient of the external non-diffusion layer 5b in the following description may hold in a mode in which the diffusion as described above occurs and/or in a mode in which diffusion as described above does not occur. This description of the external electrode 5 is also applicable to the underlying electrode 16 similarly or in the same manner.

As has been described, an ingredient of greater than or equal to 60 mass % is referred to as a main ingredient, and the main ingredient of the underlying electrode 16 is referred to as the first metal. Whether an ingredient is of greater than or equal to 60 mass % may be identified based on, for example, the material of the underlying electrode 16 before the occurrences of diffusion. When the main ingredient of the underlying electrode 16 is identified based on the underlying electrode 16 after the diffusion, for example, the main ingredient may be determined in a region of the underlying electrode 16 in thickness where the second metal is not diffused. As will be understood from later description, this region may be, for example, a region of the underlying non-diffusion layer 16b farther away from the external electrode 5 than the underlying diffusion layer 16a.

In the mode as described above in which a region where the second metal is not diffused does not exist in the underlying electrode 16, for example, whether an ingredient is of greater than or equal to 60 mass % may be determined in a region where a diffusion quantity (for example, atom %) of the second metal is the smallest (or is estimated to be the smallest). The region where the second metal is not diffused may be understood as an example of the region where the diffusion quantity of the second metal is the smallest. In a situation in which the second metal is not identified, for example, as the above-described region where the diffusion quantity of the second metal is estimated to be the smallest, a region farthest away from the external electrode 5 (on the opposite side from the external electrode 5, a central region of the underlying electrode 16 in thickness depending on the structure) may be used for the determination.

The main ingredient of the underlying electrode 16 has been described. This description is also applicable to the main ingredient of the external electrode 5 similarly or in the same manner. Furthermore, unless contradiction or the like arises, in the following description, the terms such as "the underlying electrode 16 before diffusion" may be replaced with the terms such as "a region of the underlying electrode 16 where the diffusion quantity of the second metal is the smallest". Likewise, unless contradiction or the like arises, the terms such as "the external electrode 5 before diffusion" may be replaced with the terms such as "a region of the external electrode 5 where the diffusion quantity of the first metal is the smallest".

Examples of specific modes of the diffusion layer 21 include a first mode and a second mode which are described below.

In the first mode, the underlying electrode 16 and the external electrode 5 before diffusion include respective pure metals which are different from each other. The elements of the pure metals are the first metal and the second metal. The diffusion layer 21 is an alloy of the first metal and the second metal. In a specific example, the first metal (underlying electrode 16) is Ni, the second metal (external electrode 5) is Cu, and the material of the diffusion layer 21 is an Ni—Cu alloy and/or a Cu—Ni alloy.

Even they are referred to as pure metals, of course, inevitable impurities may exist. The impurities are metal and/or nonmetal. The quantity of the impurities may be considered in determining whether a requirement of, for example, 60 mass % or 12.5 atom %, which will be described later, relating to the main ingredient is satisfied. The impurities are handled similarly or in the same manner for the case of not pure metals.

In the second mode, at least one of the underlying electrode 16 or the external electrode 5 before diffusion includes an alloy. However, the main ingredient of the material of the underlying electrode 16 and the main ingredient of the material of the external electrode 5 (the first metal and the second metal) are different from each other. The diffusion layer 21 is an alloy including the ingredients of both. In a specific example, the underlying electrode 16 consists of an Ni alloy (the first metal is Ni), the external electrode 5 consists of a Cu alloy (the second metal is Cu), and the material of the diffusion layer 21 is an Ni—Cu alloy and/or a Cu—Ni alloy.

In the specific example of the second mode, examples of sub-ingredients (for example, ingredients of smaller than or equal to 40 mass %) included in the Ni alloy (metal included in the underlying electrode 16 before diffusion) include Cr, Mo Fe, Co, and Cu. Examples of a sub-ingredient included in the Cu alloy (metal included in the external electrode 5 before diffusion) include Sn, Zn, Pb, Fe, Mn, Al, Be, W, and Ni.

As can be understood from the above-described example, in the second mode, the underlying electrode 16 before diffusion (for example, Ni alloy) may include, as the sub-ingredient thereof, the main ingredient of the external electrode 5 before diffusion (second metal: for example, Cu). However, in the case where a definition relating to the diffusion layer 21, which will be described later, is adopted, a mode in which the presence of the underlying diffusion layer 16a can be identified is a mode in which the quantity of the second metal included as the sub-ingredient of the underlying electrode 16 before diffusion is smaller than 12.5 atom %. This description of the sub-ingredient of the underlying electrode 16 is also applicable to the sub-ingredient of the external electrode 5 similarly or in the same manner.

In the above-described specific example relating to the second mode, for example, the main ingredient (each of the first metal and the second metal) includes a single element and/or a single element is understood as the main ingredient. However, unless the element included in the first metal and the element included in the second metal are not the common element, two or more elements may be main ingredients, and/or two or more elements may be understood as the main ingredients. For example, the following mode is assumed: the underlying electrode 16 before diffusion is Ni (pure metal), and the external electrode 5 before diffusion is a Cu—Al alloy. At this time, in the external electrode 5, the requirement of greater than or equal to 60 mass % may be satisfied only by Cu, or by the total of Cu and Al. In the former case, only Cu or both Cu and Al may be understood as the main ingredient of the external electrode 5.

A state of the alloy in the diffusion layer 21 is arbitrary. For example, the alloy may be mainly one of a solid solution, eutectic, or an intermetallic compound. For example, an Ni—Cu alloy or a Cu—Ni alloy is normally a solid solution. Furthermore, for example, intergranular diffusion and/or volume diffusion may occur in the diffusion layer 21.

2.2. Thickness of Diffusion Layer

A thickness t1 of the underlying diffusion layer 16a and a thickness t2 of the external diffusion layer 5a are arbitrary. For example, the thickness t1 may be greater than or equal to 1.0 μm and smaller than or equal to 3.5 μm, and/or greater than or equal to 0.25 times the thickness of the underlying electrode 16 and smaller than or equal to 0.88 times the thickness of the underlying electrode 16. The thickness t2 may be greater than or equal to 1.0 μm and smaller than or equal to 3.5 μm, and/or greater than or equal to 0.10 times the thickness of the external electrode 5 and smaller than or equal to 0.58 times the thickness of the external electrode 5. The thickness t1 and the thickness t2 may be the same or different from each other. In the case of latter, the degree of the difference is arbitrary. For example, the thickness t1 may be greater than or equal to ⅔ of the thickness t2 and smaller than or equal to 3/2 of the thickness t2 or greater than or equal to ⁶/₇ of the thickness t2 and smaller than or equal to ⅞ of the thickness t2. The examples below will describe that a certain degree of the securing force of the external electrode 5 is ensured with the above-described thickness.

Here, in a region of the underlying electrode 16 relatively far from the external electrode 5, for example, the diffusion quantity of the main ingredient of the external electrode 5 (second metal) gradually reduces as the distance from the external electrode 5 increases. Thus, a boundary line of the underlying diffusion layer 16a on the opposite side from the external electrode 5 (boundary line between the underlying diffusion layer 16a and the underlying non-diffusion layer 16b) for identifying the thickness t1 may be, for example, located at a position where the second metal becomes 12.5 atom %. In other words, the underlying diffusion layer 16a may be a region including greater than or equal to 12.5 atom % second metal. This is applicable to a boundary line for obtaining the thickness t2 similarly or in the same manner. That is, the external diffusion layer 5a may be a region including greater than or equal to 12.5 atom % main ingredient (first metal) of the underlying electrode 16.

The value of 12.5 atom % is used for obtaining the thickness t1 and the thickness t2 in the examples to be described later. Here, for convenience of obtaining the thickness t1 and/or the thickness t2, the diffusion layer is defined by using the value 12.5 atom %. However, when it is not required to obtain the thickness t1 and/or the thickness t2, the diffusion layer is not necessarily defined by such a definition. However, in a case other than obtaining the thickness t1 and/or the thickness t2, the above-described definition may be used according to need.

The boundary line between the underlying diffusion layer 16a and the underlying non-diffusion layer 16b may be identified with, for example, an accuracy required to obtain the thickness of the diffusion layer 21. In the present disclosure, for example, the number of significant figures for a range of the thickness t1 and the thickness t2 described as the examples (described above) is 0.1 μm. Thus, the boundary may be identified with an accuracy of 0.1 μm (or with a higher accuracy). Furthermore, atom % may be calculated, for example, in a unit area that allows identification of the boundary line with the above-described accuracy. For example, when the boundary line is obtained with an accuracy of 0.1 μm, the above-described unit area may be, for example, 0.01 μm² (or a smaller area). The shape of an individual unit area may be, for example, a square (for example, a square of 0.1 μm×0.1 μm).

A boundary line where the diffusion quantity becomes 12.5 atom % does not necessarily have a linear shape but may have undulations (an undulatory shape). When the undulations influence the determination of whether the thickness t1 and/or thickness t2 is included in the range exemplified in the embodiment, for example, the thickness t1 and the thickness t2 may be identified based on an average height of the above-described boundary line. The average height is also used in the examples to be described later.

In the example illustrated in FIGS. 1 to 3, the underlying electrode 16 is positioned at each of four corners on the upper surface and the lower surface of the main body portion 3. Thus, a total of eight underlying electrodes 16 are provided. The above-described range of the thickness t1 and/or the thickness t2 does not necessarily hold in all of the plurality of (eight) underlying electrodes 16. For example, the above-described range of thickness may be satisfied only in a single underlying electrode 16. Of course, the above-described range of thickness may be satisfied in all the underlying electrodes 16.

When each of the underlying electrodes 16 is focused, the above-described range of thickness is not necessarily satisfied in the entirety of the underlying electrode 16. For example, the range of thickness may be satisfied in greater than or equal to 50% or greater than or equal to 80% of the area of the underlying electrode 16. Of course, the range of thickness may be satisfied in the entirety of the underlying electrode 16. In this case, however, a singular portion may be excluded. Examples of the singular portion include an edge portion of the underlying electrode 16. The edge portion is covered with the external electrode 5 not only at the upper surface but also at the side surfaces. Thus, the diffusion layer 21 is basically formed throughout the thickness.

Whether the range of thickness exemplified in the embodiment is satisfied in greater than or equal to a certain degree of the area of each underlying electrode 16 may be determined, for example, based on a predetermined number (for example, 3, 5, or 10) of images of D1D3 sections equidistantly set in the length of the underlying electrode 16 in the D2 direction. When the plurality of images of the sections are unlikely to be extracted from a single capacitor 1, a plurality of images of the sections may be extracted from a plurality of capacitors 1 of the same type.

The images of the sections may be obtained at an appropriate magnification by using, for example, an SEM (scanning electron microscope). The SEM may have the function of color coding regions in accordance with values of atom % of a specific element. This function may be utilized for identification of a region where the first metal or the second metal is greater than or equal to 12.5 atom % and measurement of the dimensions of this region.

The interface BS is observed in the images of the SEM even when the material of the underlying electrode 16 and the material of the external electrode 5 are mixed. The reasons for this are that a hollow exists between the material of the underlying electrode 16 and the material of the external electrode 5 and/or the size of crystal particles is different between the material of the underlying electrode 16 and the material of the external electrode 5. As is the case with the boundary line of 12.5 atom %, the interface BS may be identified with an accuracy required to calculate (determine) the thickness t1 and/or the thickness t2, and an average height may be identified according to need. Of course, when the thickness t1 and/or the thickness t2 is not measured, the interface BS is not necessarily able to be observed.

3. Method for Manufacturing Capacitor

The capacitor 1 may be manufactured by a various method. For example, a general procedure of the manufacturing method may be similar to or the same as a known procedure. An example is described below.

Initially, ceramic green sheets which are to become the dielectric layers 7 and the insulating layers 17 are created. Then, a conductive paste which is to become the internal electrodes 9, the dummy electrodes 20, or the underlying electrodes 16 is applied to (for example, printed on) the ceramic green sheets. Next, the ceramic green sheets are laminated to create a laminate which is to become the main body portion 3. A laminate which is to become the effective portion 11 and portions which are to become the covers 13 for the laminate may be laminated collectively or separately.

Until the creation of the laminate, for example, the manufacturing is performed in a size of a mother substrate from which a plurality of main body portions 3 are to be obtained. After the laminate has been created, the mother substrate including the laminate is divided into (for example, cut into) chips having a size generally corresponding to the size of the main body portion 3. Then, the laminate having the size of the main body portion 3 is fired. After that, a metal film is formed on the main body portion 3, thereby forming the external electrodes 5.

Degreasing may be performed before the firing. For example, the firing may be performed under a reducing atmosphere. A reoxidation process may be performed after the firing. The main body portion 3 may be polished (for example, barrel polished) before and/or after the firing. In the polishing, for example, ridge line portions of the main body portion 3 may be chamfered or the side surfaces of the main body portion 3 may be polished.

The external electrodes 5 may be formed by various methods. For example, metal may be deposited on a surface of the underlying electrodes 16 and edge portions of the internal electrodes 9 by electroless plating and/or electrolytic plating. For example, a thin-film formation method such as dipping, printing, CVD (chemical vapor deposition), or PVD (physical vapor deposition) may be adopted. As can be understood from the above description, the underlying electrodes 16 may contribute to or do not necessarily contribute to the deposition of the metal.

To form the diffusion layer 21, the external electrodes 5 and the underlying electrodes 16 are heated while pressure is applied to the external electrodes 5 and the underlying electrodes 16. The specific method for this is arbitrary. For example, a heater may be pressed against the external electrodes 5, or the capacitor 1 may be disposed in a furnace with a tool that presses the external electrodes 5 against the underlying electrodes 16. A process for formation of the diffusion layer 21 may also function as another process (for example, an annealing process).

The temperature for heating may be appropriately set in accordance with specific types or the like of the first metal and the second metal. For example, for Ni and Cu, heating may be performed so that the temperatures of these become higher than or equal to 450° C. or 600° C. However, the temperature at this time is, for example, lower than a solidus. A specific magnitude of the pressure is also arbitrary. The thickness of the diffusion layer 21 can be adjusted by, for example, controlling heating temperature, heating time, the number of times of heating, and the like.

4. Structures of Capacitor According to Other Embodiments

4.1. Second Embodiment and the Like

Figure 4:
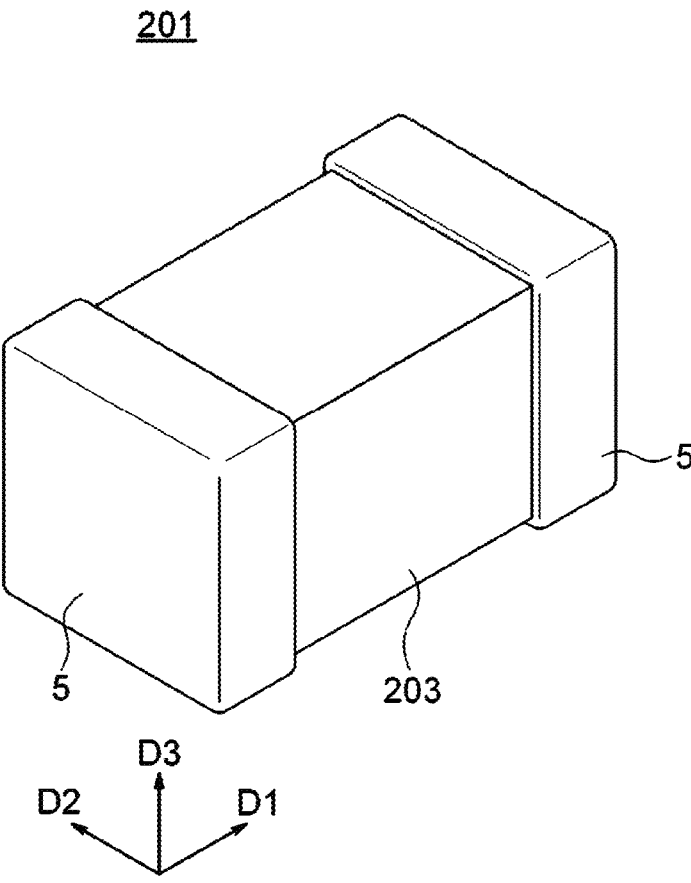
FIG. 4 is a perspective view illustrating a capacitor according to a second embodiment.

FIG. 4 is a perspective view of a capacitor 201 according to a second embodiment. FIG. 3 according to the first embodiment may be referred to as the sectional view of the capacitor 201.

In general, the capacitor 201 is different from the capacitor 1 in that the capacitor 201 is of a two-terminal type while the capacitor 1 is of a four-terminal type. In such a capacitor 201, as has been described with reference to FIG. 3, the diffusion layer 21 may be formed.

Specific shapes and dimensions of parts of the capacitor 201 may be different from those of the capacitor 1 in accordance with the fact that the capacitor 201 is of the two-terminal type. Specifically, the differences are as follows.

A shape of a main body portion 203 (or the capacitor 201) is, for example, a generally rectangular parallelepiped shape. In this rectangular parallelepiped shape, for example, the height (length in the D3 direction) may be equivalent to the width (length in the D2 direction, illustrated example) or smaller than the width. The length (the D1 direction) of the rectangular parallelepiped shape is, for example, greater than the width. The dimensions of the main body portion 203 are arbitrary. The specific examples of the dimensions of the main body portion 3 according to the first embodiment may be applied to the dimensions of the main body portion 203 as long as the length is greater in the D1 direction than in the D2 direction. The external electrodes 5 generally have a layer shape covering longitudinal end portions of the main body portion 203 through five surfaces of the rectangular parallelepiped shape.

The planar shape of the internal electrode 9 is, for example, generally a rectangular shape including four sides parallel to four sides of a rectangular shape of the main body portion 203 (dielectric layer 7). Out of four sides of the internal electrodes 9, two long sides and one short side are positioned, for example, inside (are not exposed at) the side surfaces of the main body portion 203. The remaining one short side is exposed at the side surface of the main body portion 203 on the +D1 side or −D1 side. In transparent plan view, a region of the internal electrode 9 superposed on the other internal electrodes 9 is the electrode main body 9a. The portion extending from the electrode main body 9a to the external electrode 5 is the drawn electrode 9b.

Each dummy layer 19 includes, for example, two dummy electrodes 20 at longitudinal ends of the main body portion 203. The planar shape of each dummy electrode 20 is, for example, a rectangular shape extending throughout the width (length in the D2 direction) of the main body portion 203. For example, the dummy electrode 20 is exposed at the side surface on the +D1 side or the −D1 side of the main body portion 203 and at the side surfaces on the +D2 side and the −D2 side of the main body portion 203. The above-described description of the structure of the dummy layer 19 (dummy electrode 20) in plan view may be incorporated in description of the structure of each underlying layer 15 (underlying electrode 16).

Although they are not particularly illustrated, yet other examples of the structure of the capacitor are described.

The capacitor may include exterior resin that covers the entirety of the structure exemplified in FIG. 1 or 4 and a lead that is connected to the external electrode 5 and extend from the exterior resin. From a different viewpoint, the capacitor may be of a through-hole mount type instead of a surface mount type. In such a mode, a single external electrode 5 may cover a single side surface.

Regarding two types of the internal electrodes 9 connected to the external electrodes 5 different from each other, two of the same type may be alternately laminated at each time instead of one at each time. In this case, for example, the thickness of the dielectric layers 7 connected to the same external electrode 5 and positioned between the internal electrodes 9 facing each other may be smaller than the thickness of the dielectric layers 7 connected to the external electrodes 5 different from each other and positioned between the internal electrodes 9 facing each other. As can be understood from the above description, the plurality of dielectric layers 7 do not necessarily have the same shape and the same size.

Two types of the internal electrodes 9 connected to the external electrodes 5 different from each other do not necessarily face each other. For example, by providing two types of the internal electrodes 9 connected to the external electrodes 5 different from each other in the same layer and providing the internal electrodes 9 facing the two types of internal electrodes 9 described above, a circuit in which two parallel-plate capacitors are connected in series may be formed. A circuit in which three or more parallel-plate capacitors are connected in series may be formed.

In the example illustrated in FIG. 4, portions of, for example, the edge portions of the internal electrode 9 other than the −D1 side or the +D1 side (referred to as non-exposure edge portions in the present paragraph) are not exposed at the side surfaces of the main body portion 203. The non-exposure edge portions are covered with portions of the dielectric layer 7 and the insulating layer 17 extending outward beyond the non-exposure portions. However, the non-exposure edge portions may be covered with another dielectric layer superposed on the side surfaces of the laminate formed by the dielectric layers 7 and the insulating layers 17 so that the non-exposure edge portions are not exposed. From a different viewpoint, it is not necessary for the entire main body portion 203 to include a laminate structure.

4.2. Third Embodiment

Figure 6:
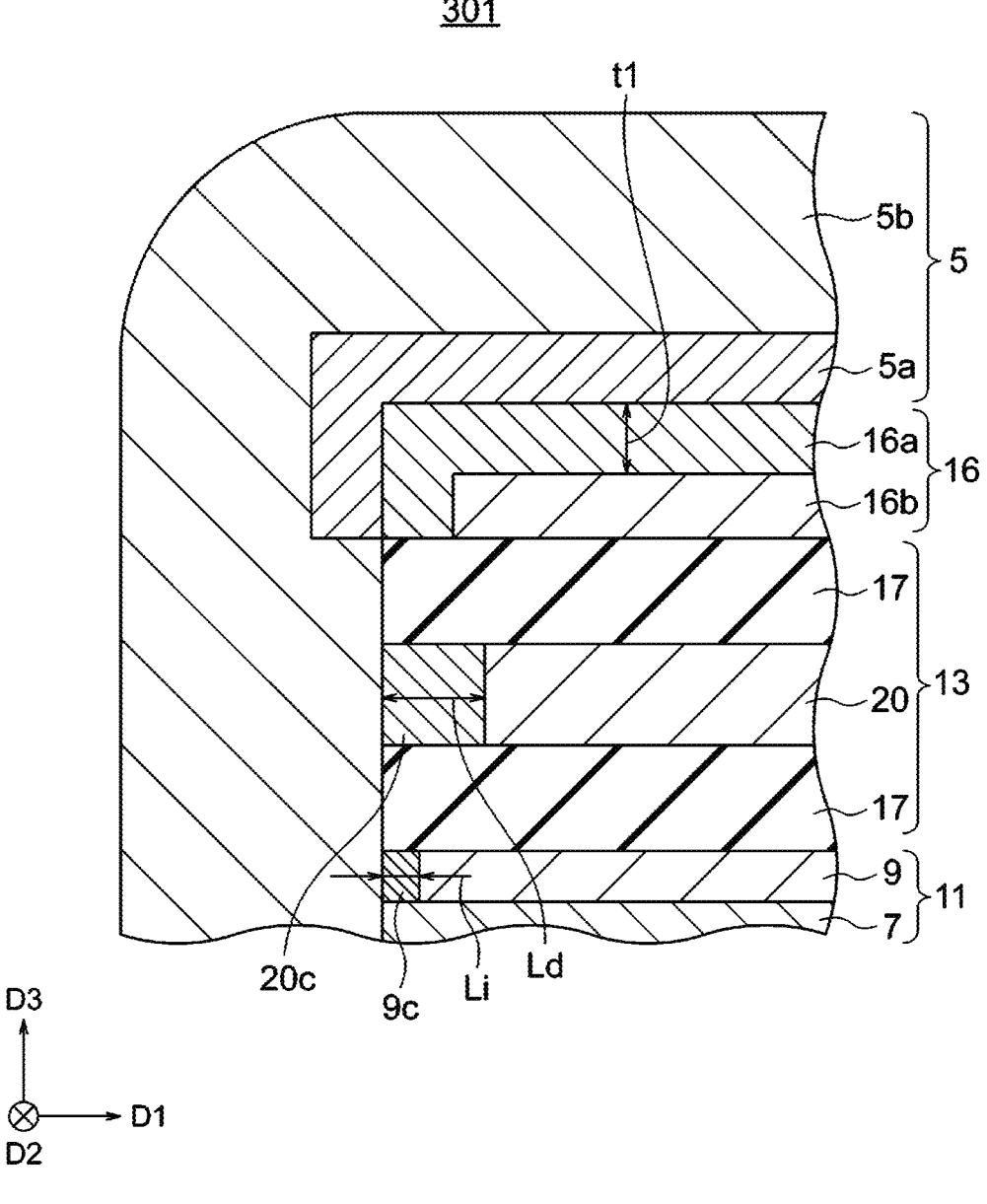
FIG. 6 is a schematic sectional view illustrating part of a capacitor according to a third embodiment.

FIG. 6 is a schematic sectional view illustrating part of a capacitor 301 according to a third embodiment and corresponds to region VI illustrated in FIG. 3.

In the capacitor 301, diffusion also occurs between the internal electrodes 9 and the external electrodes 5. Furthermore, diffusion also occurs between the dummy electrodes 20 and the external electrodes 5. Only one of the former diffusion or the latter diffusion may occur. The third embodiment may be applied to any of the embodiments having been described. Unless contradiction or the like arises, the description having been made relating to diffusion between the underlying electrodes 16 and the external electrodes 5 (description in section 2 and the like) may be incorporated in description of diffusion relating to internal electrodes 9 and diffusion relating to the dummy electrodes 20 by, for example, replacing the terms of the underlying electrodes 16 with the terms of the internal electrodes 9 or the terms of the dummy electrodes 20.

Specifically, as has been described, the drawn electrode 9b of the internal electrode 9 (in other words, the edge portion of the internal electrode 9) is in contact with an inner side surface of the external electrode 5. The internal electrode 9 and the external electrode 5 are secured by sharing a diffusion portion in which the material of the internal electrode 9 and the material of the external electrode 5 coexist with each other. In transparent plan view, the diffusion portion extends along the edge portion of the internal electrode 9. FIG. 6 illustrates only an internal diffusion portion 9c out of the above-described diffusion portion formed by diffusion of the material of the external electrode 5 in the material of the internal electrode 9. That is, illustration of an external diffusion portion is omitted. The external diffusion portion is formed by diffusion of the material of the internal electrode 9 in the external electrode 5. For the external electrode 5, the area where the internal electrode 9 is in contact with the external electrode 5 is small. Accordingly, the external diffusion portion is not necessarily formed or may have such a small size that the external diffusion portion is unlikely to be observed.

Unless contradiction or the like arises, the description above may be incorporated in description of diffusion of the dummy electrodes 20 and the external electrodes 5 by, for example, replacing the terms of the internal electrodes 9 with the terms of the dummy electrodes 20 and the terms of internal diffusion portions 9c with the terms of dummy diffusion portions 20c.

As has been described, the materials of the internal electrodes 9, the dummy electrodes 20, and the underlying electrodes 16 are the same or different from each other. This is also true when diffusion occurs between the internal electrodes 9 and the external electrodes 5 and/or between the dummy electrodes 20 and the external electrodes 5. For example, the internal electrodes 9, the dummy electrodes 20, and the underlying electrodes 16 may be Ni or an alloy the main ingredient of which is Ni, and the external electrodes 5 may be Cu or an alloy main ingredient of which is Cu.

A length Li of the internal diffusion portion 9*c* from the edge portion of the internal electrode 9 (from a different viewpoint, a width of the internal diffusion portion 9*c* extending along the edge portion of the internal electrode 9 in plan view) is arbitrary. Likewise, a length Ld of a dummy diffusion portion 20*c* from an edge portion of the dummy electrode 20 (from a different viewpoint, a width of the dummy diffusion portion 20*c* extending along the edge portion of the dummy electrode 20 in plan view) is arbitrary. For example, it is allowable that at least one selected from the group consisting of Li<t1, t1<Ld, and Li<Ld holds, or none of Li<t1, t1<Ld, and Li<Ld holds. For example, Li<t1<Ld may hold (illustrated example).

The specific dimensions and the like of Li, Ld, and t1 are arbitrary when the above-described relationships hold. Examples when, for example, Li<t1<Ld (or part of Li<t1<Ld) holds include the following. The thickness t1 may be greater than or equal to 1.05, 1.10, or 1.50 times Li and smaller than or equal to 7.00, 6.00, or 5.00 times Li. Any one of the above-described lower limits and any one of the above-described upper limits may be combined with each other. The length Ld may be greater than or equal to 1.05, 1.10, or 1.50 times t1 and smaller than or equal to 5.00, 3.00, or 2.00 times t1. Any one of the above-described lower limits and any one of the above-described upper limits may be combined with each other. The length Ld may be greater than or equal to 1.10, 1.20, or 1.50 times Li and smaller than or equal to 12.00, 10.00, or 5.00 times Li. Any one of the above-described lower limits and any one of the above-described upper limits may be combined with each other. The thickness t1 may be greater than or equal to 0.30 μm and smaller than or equal to 6.00 μm. The length Li may be greater than or equal to 0.20 μm and smaller than or equal to 5.90 μm (however, Li<t1). The length Ld may be greater than or equal to 1.00 μm and smaller than or equal to 7.00 μm (however, Ld>Li and/or Ld>t1). The difference between the Li and t1 may be greater than or equal to 0.10 μm or 0.30 μm. The difference between t1 and Ld may be greater than or equal to 0.10 μm or 0.30 μm. The difference between Li and Ld may be greater than or equal to 0.20 μm or 0.4 μm.

The conditions of, for example, the above-described relationships and/or the dimensions may hold for a single external electrode 5 or two or more (for example, all or more than 50%) of the external electrodes 5. Furthermore, when each of the external electrodes 5 is focused, the above-described conditions may hold only for a single underlying electrode 16, a single internal electrode 9, and/or a single dummy electrode 20 bonded to the single external electrode 5 or may hold for two or more (for example, all or more than 50%) of the underlying electrodes 16, the internal electrodes 9, or the dummy electrodes 20. In the case of the latter, actual values or average values of the electrodes may satisfy the above-described conditions.

For example, when the thickness t1 relating to a single underlying electrode 16 and the length Li of the internal electrode 9 connected to the external electrode 5 to which the single underlying electrode 16 is connected are compared, an average value of the length Li of ten or more internal electrodes 9 and/or greater than or equal to 30% (or greater than or equal to 60%) of the total number of the internal electrodes 9 may be used. Likewise, when the thickness t1 relating to a single underlying electrode 16 (or the average value of the length Li) and the length Ld of the dummy electrode 20 connected to the external electrode 5 to which the single underlying electrode 16 is connected are compared, an average value of the length Ld of two or more (however, a single dummy electrode when only the single dummy electrode 20 is provided) dummy electrodes 20 and/or greater than or equal to 30% (or greater than or equal to 60%) of the total number of the dummy electrodes 20 may be compared to the thickness t1 (or the average value of the length Li).

The above-described conditions relating to the relationships and/or the dimensions of Li, t1, and Ld do not necessarily hold throughout the lengths of the edge portions of the internal electrode 9 and/or the dummy electrodes 20 (portions in contact with the external electrode 5). For example, it is sufficient only to satisfy greater than or equal to 50% or 80% of the length of a specific edge portion (one side or two sides) of the internal electrode 9 (or the dummy electrode 20) in contact with the external electrode 5. Whether the above-described conditions are satisfied in greater than or equal to a certain degree of length as described above may be determined, for example, based on a predetermined number (for example, 3, 5, or 10) of images of sections (for example, D1D3 sections) equidistantly set with respect to the edge portion. When the plurality of images of the sections are unlikely to be extracted from a single capacitor 1, a plurality of images of the sections may be extracted from a plurality of capacitors 1 of the same type.

The length Li may be obtained in an image illustrating a section such as FIG. 6 obtained with the SEM or the like. The section may extend along, for example, a direction perpendicular to the edge portion (for example, a portion extending in the D2 direction and in contact with the external electrode 5) of the internal electrode 9 (cutting direction, for example, the D1 direction) in plan view (for example, the D1D3 section). Furthermore, the section may be appropriately away from the edge portion (singular portion) of the internal electrode 9 along the cutting direction (for example, a section crossing a central position of the edge portion extending in the D2 direction). Similarly to or in the same manner as the thickness t1, a range in which the main ingredient of the external electrode 5 (second metal) becomes greater than or equal to 12.5 atom % is identified as the internal diffusion portion 9*c* and the length Li may be measured. When the length Li varies in the thickness direction of the internal electrode 9, for example, the maximum value may be used as the length Li for comparison with the thickness t1 or the like.

The above description may be incorporated in description of the length Ld by replacing the terms of the internal electrodes 9, the internal diffusion portions 9*c*, and the length Li with the terms of the dummy electrodes 20, the dummy diffusion portions 20*c*, and the length Ld, respectively. In the determination of whether the conditions relating to the relationships and/or the dimensions of Li, t1, and Ld having been described are satisfied, Li, t1, and Ld may be obtained from a plurality of the same images (or may be a single sectional image depending on a situation). In this case, comparison may be made in each of the sections to determine whether the above-described conditions are satisfied in a plurality (for example, greater than or equal to 60%) of sections, or average values of each dimension (Li, t1, or Ld) in the plurality of sections may be compared to determine whether the above-described conditions are satisfied. As the thickness t1 measured in each section and to be compared with Li and/or Ld, an average value except for the singular portion (for example, the edge portion) may be used. The above-described average value of the thickness t1 may be, for example, when the D1D3 section is used as the example, an average value in a length greater than or equal to 30%, 50%, or 80% of the entire length in the D1 direction of the underlying electrode 16.

The method for manufacturing for realizing the conditions relating to the relationships and/or the dimensions of Li, t1, and Ld is arbitrary. For example, in the method for manufacturing having been described for the first embodiment, the above-described conditions may be realized by adjusting a particle diameter of a metal particle (for example, a Ni particle) included in the conductive paste which is to become the underlying electrode 16, the internal electrode 9 and/or the dummy electrode 20. As the particle diameter of the metal particle included in each electrode (16, 9, or 20) increases, the likelihood of diffusion of the material of the external electrode 5 (for example, Cu) in the electrode of the former increases. Arbitrary Li, t1, and Ld can be realized by adjusting the particle diameter while the temperature or the like of each electrode in a heating process is considered. For example, in a prototype of the applicant, the above-described conditions were successfully realized by setting the particle diameters of the Ni particle included in the conductive pastes which is to become the electrodes are set as follows: 150 to 200 nm for the conductive paste which is to become the internal electrode 9; 350 to 400 nm for the conductive paste which is to become the underlying electrode 16, and 350 to 400 nm for the conductive paste which is to become the dummy electrode 20.

5. Examples

The capacitor 1 according to the embodiments is prototyped to evaluate the securing force of the external electrode 5. As a result, it is confirmed that, with the diffusion layer 21, the capacitor 1 including the external electrode 5 having a large securing force can be obtained. Specifically, as follows.

FIG. 5 is a table listing specifications of capacitors 1 according of the examples.

In this drawing, "No." indicates types of the capacitor according to the examples. Structures (thickness t1 and/or thickness t2) of examples E1 to E7 relating to the diffusion layer 21 are different from each other.

Columns "t1 (μm)" and "t2 (μm)" respectively indicate values of the thickness t1 and values of thickness t2. In example E1 to E7, thickness t1 and the thickness t2 are each set in a range of 0.9 to 3.5 μm. In examples E1, E6, and E7, t1=t2. In examples E2 and E4, t1<t2. In examples E3 and E5, t1>t2.

The "Qual." column indicates evaluation results of quality of the capacitor 1 according to the examples. Specifically, for each of examples E1 to E7, 100 samples were created, and whether the external electrode 5 peeled off from the underlying electrode 16 was checked. In the above-described column, the number of samples in which the peeling occurred is indicated as a numerator of a fraction.

The material of the underlying electrode 16 was Ni. The material of the external electrode 5 was Cu. The thickness of the underlying electrode 16 was set to a value in a range greater than or equal to 2 μm and smaller than or equal to 4 μm (design value is 3 μm). The thickness of the external electrode 5 was set to a value in a range greater than or equal to 2 μm and smaller than or equal to 10 μm (design value is 6 μm). As has been described, the thickness t1 and the thickness t2 were measured based on the images obtained with the SEM.

As illustrated in FIG. 5, although peeling occurred in two samples of example E7 having a smallest thickness t1 and a smallest thickness t2, peeling occurred in none of 100 samples in each of examples E1 to E6. Although a sample without the diffusion layer 21 was not created, it can be surmised that formation of the diffusion layer 21 reduces the probability of peeling of the external electrode 5 from the above-described results.

Both the thickness t1 and the thickness t2 of example E7 in which peeling occurred were 0.9 μm. Both the thickness t1 and the thickness t2 of each of examples E1 to E6 in which no peeling occurred were greater than or equal to 1.0 μm. Accordingly, it can be understood that a securing force of greater than or equal to a certain degree can be obtained by setting both the thickness t1 and the thickness t2 to greater than or equal to 1.0 μm.

When a minimum value of the thickness t1 of examples E1 to E6 (1.0 μm) is divided by an appropriate value selected from the range of the thickness of the underlying electrode 16 of the sample (for example, 2.0 μm, 3.0 μm, or 4.0 μm) to be normalized, 0.50, 0.33, or 0.25 is obtained (by rounding off the numbers to two decimal places. This is also applicable to description below similarly or in the same manner). When a maximum value of the thickness t1 of examples E1 to E6 (3.5 μm) is divided by an appropriate value selected from the range of the thickness of the underlying electrode 16 of the sample (for example, 3.5 μm or 4.0 μm) to be normalized, 1.00 or 0.88 is obtained. The range of the thickness t1 may be defined by the upper limit and/or the lower limit obtained as described above. An example of this has already been described.

When a minimum value of the thickness t2 of examples E1 to E6 (1.0 μm) is divided by an appropriate value selected from the range of the thickness of the external electrode 5 of the sample (for example, 2.0 μm, 6.0 μm, or 10.0 μm) to be normalized, 0.50, 0.17, or 0.10 is obtained. When a maximum value of the thickness t2 of examples E1 to E6 (3.5 μm) is divided by a value in appropriate values selected from the range of the thickness of the underlying electrode 16 of the sample (for example, 3.5 μm, 6 μm, or 10 μm) to be normalized, 1.00, 0.58, or 0.35 is obtained. The range of the thickness t2 may be defined by the upper limit and/or the lower limit obtained as described above. An example of this has already been described.

6. Summarization of Embodiments

In the following description, reference numerals of any of the embodiments are used for convenience. However, unless contradiction or the like arises, the contents described below are similar or the same in the other embodiments. The effects exemplified below are not necessarily produced.

A multilayer electronic component (capacitor 1) includes an effective portion 11, a cover 13, an underlying electrode 16, and an external electrode 5. The effective portion 11 includes dielectric layers 7 and internal electrodes 9 alternately laminated in a laminating direction (D3 direction). The cover 13 on a +D3 side is superposed on the effective portion 11 from the +D3 side out of a first side (for example, the +D3 side) and a second side (for example, a −D3 side) in the D3 direction. The underlying electrode 16 on the +D3 side is superposed on the cover 13 from the +D3 side. The external electrode 5 on the +D3 side is superposed on the underlying electrode 16 on the +D3 side from the +D3 side. The underlying electrode 16 and the external electrode 5 may be secured by sharing a diffusion layer 21 in which a material of the underlying electrode 16 and a material of the external electrode 5 coexist with each other.

Accordingly, for example, as has been described in the outline of embodiments, a securing force of the external electrode 5 to the underlying electrode 16 can be increased. This results in, for example, reduction of a probability of producing defectives in which the external electrode 5 peels off from the underlying electrode 16. Thus, productivity improves.

An edge portion of each of the internal electrodes 9 and the external electrode 5 may be in contact with each other. A thickness t1 by which the material of the external electrode 5 is diffused in the underlying electrode 16 at greater than or equal to 12.5 atom % may be greater than a length Li from the edge portion of the internal electrode 9 of a portion in which the material of the external electrode 5 is diffused in the internal electrode 9 at greater than or equal to 12.5 atom % (internal diffusion portion 9$c$).

In this case, for example, the thickness t1 is relatively large. Thus, the above-described effect of increasing the securing force is improved. Meanwhile, the length Li is relatively small. Thus, a probability of expansion of the internal electrode 9 due to diffusion is reduced. As a result, for example, a probability of peeling off of the internal electrode 9 and the dielectric layer 7 is reduced. Furthermore, for example, a probability of degradation of the characteristics of the capacitor 301 due to expansion (and further, peeling) of the internal electrode 9 is reduced.

The cover 13 may include two or more insulating layers 17 laminated in the D3 direction and a dummy electrode 20 positioned at boundaries of the two or more insulating layers 17. An edge portion of the dummy electrode 20 and the external electrode 5 may be in contact with each other. The thickness t1 by which the material of the external electrode 5 is diffused in the underlying electrode 16 at greater than or equal to 12.5 atom % may be smaller than a length Ld from the edge portion of the dummy electrode 20 of a portion (dummy diffusion portion 20$c$) in which the material of the external electrode 5 is diffused in the dummy electrode 20 at greater than or equal to 12.5 atom %.

In this case, for example, the length Ld is relatively large. Thus, the securing force between the dummy electrode 20 and the external electrode 5 can be increased. Unlike the internal electrode 9, the dummy electrode 20 does not directly affect the characteristics of the capacitor 1. Thus, when the length Ld is increased, unlike the case where the length Li is increased, a probability of degradation of the characteristics of the capacitor 1 is low. A contact area between the dummy electrode 20 and the external electrode 5 is normally smaller than a contact area between the underlying electrode 16 and the external electrode 5. Thus, when Ld>t1, the securing force of the external electrode 5 to the cover 13 is generally likely to be improved.

An edge portion of the internal electrode 9 (first edge portion) and the external electrode 5 may be in contact with each other, and an edge portion of the dummy electrode 20 (second edge portion) and the external electrode 5 may be in contact with each other. The length Li may be smaller than the length Ld.

In this case, as can be understood from the description having been made, the securing force between the dummy electrode 20 and the external electrode 5 can be increased. Meanwhile, a probability of expansion (and further, peeling) of the internal electrode 9 due to diffusion is reduced.

The thickness t1 by which the material of the external electrode 5 (and/or a second metal) is diffused in the underlying electrode 16 at greater than or equal to 12.5 atom % may be greater than or equal to 1.0 μm and smaller than or equal to 3.5 μm. From a different viewpoint, the thickness t1 may be greater than or equal to 0.25 times a thickness of the underlying electrode 16 and smaller than or equal to 0.88 times the thickness of the underlying electrode 16.

In this case, for example, when the thickness t1 is greater than or equal to 1.0 μm and/or greater than or equal to 0.25 times, a certain degree or higher securing force of the external electrode 5 to the underlying electrode 16 can be obtained as has been described according to the embodiments. When the thickness t1 becomes excessively great, for example, although it depends on types of a first metal and the second metal, generally, the volume of the underlying diffusion layer 16$a$ increases. As a result, for example, stress is produced and cracking occurs between the underlying diffusion layer 16$a$ and another layer (for example, the insulating layer 17 and/or the underlying non-diffusion layer 16$b$). When the thickness t1 is smaller than or equal to 3.5 μm and/or smaller than or equal to 0.88 times, for example, a probability of cracking occurring as described above can be reduced.

A thickness t2 by which the material of the underlying electrode 16 (and/or a first metal) is diffused in the external electrode 5 at greater than or equal to 12.5 atom % may be greater than or equal to 1.0 μm and smaller than or equal to 3.5 μm. From a different viewpoint, the thickness t2 may be greater than or equal to 0.10 times a thickness of the external electrode 5 and smaller than or equal to 0.58 times the thickness of the external electrode 5.

In this case, for example, when the thickness t2 is greater than or equal to 1.0 μm and/or greater than or equal to 0.10 times, a certain degree or higher securing force of the external electrode 5 to the underlying electrode 16 can be obtained as has been described according to the embodiments. When diffusion boding is performed, although it depends on the conditions of the diffusion bonding, voids are produced. When the thickness t2 becomes excessively great, the ratio of a total volume of the voids to the volume of the external electrode 5 becomes high. As a result, for example, electric resistivity of the external electrode 5 increases, and the electric characteristics of the capacitor 1 is degraded. When the thickness t2 is smaller than or equal to 3.5 μm and/or smaller than or equal to 0.58 times, for example, the degradation of the electric characteristics as described above can be reduced.

The thickness t2 may be greater than or equal to ⅔ and smaller than or equal to 3/2 of the thickness t1. In other words, the thickness t1 may be greater than or equal to ⅔ and smaller than or equal to 3/2 of the thickness t2.

This reduces, for example, a probability of deviation in formation of the diffusion layer 21 to one of the underlying electrode 16 or the external electrode 5 and a resulting increase in thickness t1 or t2 with respect to the total thickness of the diffusion layer 21 (t1+t2). In turn, this reduces a probability of the above-described inconvenience occurring due to an excessive increase in the thickness t1 or t2. From a different viewpoint, the probability of the excessive increase in thickness t1 or t2 can be reduced while the thickness of the diffusion layer 21 can be increased so as to increase the securing force.

In at least a region of the underlying electrode 16 far from the external electrode 5, a main ingredient of the underlying electrode 16 may be a first metal. In at least a region of the external electrode 5 far from the underlying electrode 16, a main ingredient of the external electrode 5 may be a second metal different from the first metal. In the diffusion layer 21, the first metal may be diffused in the external electrode 5 and the second metal may be diffused in the underlying electrode 16. In a section parallel to the D3 direction, the diffusion layer 21 may include the first metal at greater than or equal to 12.5 atom % per an area of 0.01 μm² and the second metal at greater than or equal to 12.5 atom % per an area of 0.01 μm².

In this case, for example, a certain degree of diffusion occurs. Thus, the effects having been described are more effectively produced.

The technique according to the present disclosure is not limited to the above-described embodiments but may be performed in various modes.

For example, the multilayer electronic component is not limited to the capacitor. For example, in the multilayer electronic component, one subset of a plurality of internal electrodes may be used to form a capacitor, and another subset of the plurality of internal electrodes may be used to form an inductor or a resistor. As a whole, the multilayer electronic component may form an appropriate circuit (for example, a resonance circuit). The cover, the underlying electrode, and the external electrode may be provided on only one of the upper surface or the lower surface of the effective portion.

The external electrode 5 is not necessarily in contact with the internal electrode 9 and/or the dummy electrode 20. For example, the underlying electrode 16 may cover an end surface of the cover 13 so as to be in contact with the dummy electrode 20, or cover an end surface of the effective portion 11 so as to be in contact with the internal electrode 9.

What is claimed is:

1. A multilayer electronic component comprising:
an effective portion including dielectric layers and internal electrodes alternately laminated in a laminating direction;
a cover superposed on the effective portion from a first side out of the first side and a second side in the laminating direction;
an underlying electrode superposed on the cover from the first side; and
an external electrode superposed on the underlying electrode from the first side,
wherein the underlying electrode and the external electrode are secured by sharing a diffusion layer in which a material of the underlying electrode and a material of the external electrode coexist with each other,
wherein a first edge portion of each of the internal electrodes and the external electrode are in contact with each other, and
wherein a thickness by which the material of the external electrode is diffused in the underlying electrode at greater than or equal to 12.5 atom % is greater than a length of a portion in which the material of the external electrode is diffused in the internal electrode at greater than or equal to 12.5 atom %, the length being from the first edge portion.

2. The multilayer electronic component according to claim 1, wherein
the cover includes:
two or more insulating layers laminated in the laminating direction, and
a dummy electrode positioned at boundaries of the two or more insulating layers
a second edge portion of the dummy electrode and the external electrode are in contact with each other, and
a thickness by which the material of the external electrode is diffused in the underlying electrode at greater than or equal to 12.5 atom % is smaller than a length of a portion in which the material of the external electrode is diffused in the dummy electrode at greater than or equal to 12.5 atom %, the length being from the second edge portion.

3. The multilayer electronic component according to claim 1, wherein
the cover includes:
two or more insulating layers laminated in the laminating direction, and
a dummy electrode positioned at boundaries of the two or more insulating layers,
a second edge portion of the dummy electrode and the external electrode are in contact with each other, and
a length of a portion in which the material of the external electrode is diffused in the internal electrode at greater than or equal to 12.5 atom %, the length being from the first edge portion is smaller than a length of a portion in which the material of the external electrode is diffused in the dummy electrode at greater than or equal to 12.5 atom %, the length being from the second edge portion.

4. The multilayer electronic component according to claim 1,
wherein the thickness by which the material of the external electrode is diffused in the underlying electrode at greater than or equal to 12.5 atom % is greater than or equal to 1.0 μm and smaller than or equal to 3.5 μm.

5. The multilayer electronic component according to claim 1,
wherein a thickness by which the material of the underlying electrode is diffused in the external electrode at greater than or equal to 12.5 atom % is greater than or equal to 1.0 μm and smaller than or equal to 3.5 μm.

6. The multilayer electronic component according to claim 1,
wherein the thickness by which the material of the external electrode is diffused in the underlying electrode at greater than or equal to 12.5 atom % is greater than or equal to 0.25 times a thickness of the underlying electrode and smaller than or equal to 0.88 times the thickness of the underlying electrode.

7. The multilayer electronic component according to claim 1,
wherein a thickness by which the material of the underlying electrode is diffused in the external electrode at greater than or equal to 12.5 atom % is greater than or equal to 0.10 times a thickness of the external electrode and smaller than or equal to 0.58 times the thickness of the external electrode.

8. The multilayer electronic component according to claim 1,
wherein a thickness by which the material of the underlying electrode is diffused in the external electrode at greater than or equal to 12.5 atom % is greater than or equal to ⅔ and smaller than or equal to 3/2 of a thickness by which the material of the external electrode is diffused in the underlying electrode at greater than or equal to 12.5 atom %.

9. The multilayer electronic component according to claim 1,
wherein, in at least a region of the underlying electrode far from the external electrode, a main ingredient of the underlying electrode is a first metal, and
in at least a region of the external electrode far from the underlying electrode, a main ingredient of the external electrode is a second metal different from the first metal,

wherein, in the diffusion layer, the first metal is diffused in the external electrode and the second metal is diffused in the underlying electrode, and wherein, in a section parallel to the laminating direction, the diffusion layer includes the first metal at greater than or equal to 12.5 atom % per an area of 0.01 μm² and the second metal at 12.5 atom % per an area of 0.01 μm².

10. The multilayer electronic component according to claim 1, wherein, a main component of the internal electrodes is Ni, a main component of the underlying electrode is Ni, and a main component of the external electrode is Cu.

11. The multilayer electronic component according to claim 1, wherein, the external electrode is formed by plating.

12. The multilayer electronic component according to claim 2, wherein a length of a portion in which the material of the external electrode is diffused in the internal electrode at greater than or equal to 12.5 atom %, the length being from the first edge portion is smaller than a length of a portion in which the material of the external electrode is diffused in the dummy electrode at greater than or equal to 12.5 atom %, the length being from the second edge portion.

13. A multilayer electronic component comprising:

an effective portion including dielectric layers and internal electrodes alternately laminated in a laminating direction;

a cover, superposed on the effective portion from a first side out of the first side and a second side in the laminating direction, and including:

two or more insulating layers laminated in the laminating direction, and

a dummy electrode positioned at boundaries of the two or more insulating layers;

an underlying electrode superposed on the cover from the first side; and an external electrode superposed on the underlying electrode from the first side, wherein the underlying electrode and the external electrode are secured by sharing a diffusion layer in which a material of the underlying electrode and a material of the external electrode coexist with each other, wherein a first edge portion of each of the internal electrodes and the external electrode are in contact with each other, wherein a second edge portion of the dummy electrode and the external electrode are in contact with each other, and wherein a length of a portion in which the material of the external electrode is diffused in the internal electrode at greater than or equal to 12.5 atom %, the length being from the first edge portion is smaller than a length of a portion in which the material of the external electrode is diffused in the dummy electrode at greater than or equal to 12.5 atom %, the length being from the second edge portion.

14. The multilayer electronic component according to claim 13, wherein a thickness by which the material of the external electrode is diffused in the underlying electrode at greater than or equal to 12.5 atom % is smaller than a length of a portion in which the material of the external electrode is diffused in the dummy electrode at greater than or equal to 12.5 atom %, the length being from the second edge portion.

* * * * *